United States Patent
Depestel et al.

(10) Patent No.: US 9,936,642 B2
(45) Date of Patent: Apr. 10, 2018

(54) CROP PICK-UP, AGRICULTURAL EQUIPMENT AND METHOD OF EJECTING A FOREIGN OBJECT

(71) Applicant: CNH Industrial America LLC, New Holland, PA (US)

(72) Inventors: Bernard E. D. Depestel, Oedelem (BE); Ward M. R. Byttebier, Zwevegem (BE); Stijn Van Belleghem, Maldegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/104,879

(22) PCT Filed: Dec. 16, 2014

(86) PCT No.: PCT/EP2014/078083
§ 371 (c)(1),
(2) Date: Jun. 15, 2016

(87) PCT Pub. No.: WO2015/091567
PCT Pub. Date: Jun. 25, 2015

(65) Prior Publication Data
US 2016/0302360 A1 Oct. 20, 2016

(30) Foreign Application Priority Data
Dec. 16, 2013 (BE) .................................. 2013/0844

(51) Int. Cl.
*A01D 89/00* (2006.01)
*A01D 75/18* (2006.01)
*A01D 90/10* (2006.01)

(52) U.S. Cl.
CPC ......... *A01D 89/004* (2013.01); *A01D 75/187* (2013.01); *A01D 89/005* (2013.01); *A01D 90/10* (2013.01)

(58) Field of Classification Search
CPC .. A01D 43/085; A01D 43/087; A01D 75/187; A01D 89/004; A01D 89/005;
(Continued)

(56) References Cited

U.S. PATENT DOCUMENTS

| 7,140,169 B2 * | 11/2006 | Ameye | A01F 29/14 56/10.2 J |
| 7,464,525 B2 * | 12/2008 | Dueckinghaus | F16H 61/4043 56/10.2 J |
| 7,721,515 B2 * | 5/2010 | Pollklas | A01D 43/085 56/10.2 J |

FOREIGN PATENT DOCUMENTS

| CA | 2530169 A1 | 6/2007 |
| DE | 102008048060 A1 | 3/2010 |

(Continued)

*Primary Examiner* — Robert E Pezzuto
(74) *Attorney, Agent, or Firm* — Peter K. Zacharias

(57) ABSTRACT

A pick-up, an agricultural implement, and a method for ejecting a foreign object by the crop pick-up and the agricultural implement are provided. The agricultural implement comprises a crop inlet to collect picked-up crop. The crop pick-up comprises a reel with pick-up fingers to pick up the crop from the field, an auger to transport the picked-up crop to the crop inlet of the agricultural implement, and a driver. The driver rotates the reel and the auger in a pick-up direction and a collection direction for picking up and transporting the crop, and a retrieval direction for retrieving already collected crop when a foreign object is detected in the collected crop. The crop pick-up further comprises an ejector to actively rotate the reel in an ejection direction for ejecting the retrieved crop.

9 Claims, 2 Drawing Sheets

(58) Field of Classification Search
CPC ......... A01D 90/10; A01F 29/14; A01F 29/16; F16H 61/4104; F16H 61/4043; F16H 61/4157
USPC ..... 56/10.2 J, 10.2 R, 11.9, 10.5, 10.8, 10.9, 56/11.1, 11.3, 364; 460/1–3
See application file for complete search history.

(56) References Cited

FOREIGN PATENT DOCUMENTS

| | | |
|---|---|---|
| DE | 202011001967 U1 | 3/2011 |
| EP | 1864567 A1 | 12/2007 |

\* cited by examiner

CROP PICK-UP, AGRICULTURAL EQUIPMENT AND METHOD OF EJECTING A FOREIGN OBJECT

CROSS REFERENCE TO RELATED APPLICATION

This application is the National Stage of International Application No. PCT/EP2014/078083 filed Dec. 16, 2014, which claims priority to Belgian Application No. 2013/0844 filed Dec. 16, 2013, the contents of which are incorporated herein by reference.

TECHNICAL FIELD OF THE INVENTION

The present invention relates to a crop pick-up for an agricultural implement, the agricultural implement comprising a crop inlet to collect picked-up crop. The crop pick-up comprises a rake comprising a reel with pick-up fingers to pick up the crop from the field, an auger to transport the picked-up crop to the crop inlet of the agricultural implement, and drive means to rotate the reel and the auger in a pick-up direction and in a collection direction for picking up and transporting the crop and to rotate the auger in a retrieval direction for retrieving already collected crop when a foreign object is detected in the collected crop.

This invention further relates to an agricultural implement with such a crop pick-up and a method for ejecting a foreign object from such an agricultural implement.

BACKGROUND OF THE INVENTION

Such crop pick-ups are, for example, used in combination with forage harvesters for picking up grass. The forage harvester drives over a swath of grass that is picked up by the grass crop pick-up and subsequently chopped by the forage harvester. The chopped grass can then be used as forage.

The current generation of New Holland forage harvesters is optionally equipped with the advanced MetaLoc™ metal detection system. This system is equipped with six detection zones which bring the infeed rolls of the forage harvester to a standstill within 300 milliseconds when metal is detected. The location of the metal is shown on a monitor, the driver stops the forage harvester and a reverse clutch flips the windguard of the crop pick-up automatically open and reverses the auger to retrieve the crop from the forage harvester. This makes it possible to remove the metal before it ends up in the cutter drum or blower of the forage harvester, where it can cause extensive damage to the forage harvester. This also prevents the metal from ending up in the forage, which would entail safety risks for the cattle.

A similar system can also be applied to other agricultural implements for picking up crops from a field, such as, for example, balers or loading wagons. Besides metal parts, other crop-foreign objects, too, like wood or rocks, can prove dangerous for the agricultural implement or the cattle which would eventually consume the picked-up crop. There are detectors available that are able to detect non-metal foreign objects in the crop flow.

It is a drawback of the current system that often, part of the crop retrieved from the forage harvester is caught in the crop pick-up between the reel and the auger. Since the crop intake is stopped as soon as the foreign object is detected, this foreign object will, in most cases, be located in that part of the crop that is still on the crop pick-up. If the driver were to start driving with the foreign object still in the crop pick-up, it is most likely that the foreign object would end up in the forage harvester once more. That is why the driver of the forage harvester has to get out first, walk up to the crop pick-up, remove the foreign object from the retrieved crop (to be found in the place shown on the monitor), walk back and get into the cab of the forage harvester, before he can continue his way. There is, therefore, a need for an improvement to the system, which makes it unnecessary for the driver to get out when a foreign object is detected.

SUMMARY OF THE INVENTION

According to a first aspect of the invention, the above-mentioned problem is resolved by providing a crop pick-up according to claim 1. Here the crop pick-up is further equipped with ejection means that are configured to actively rotate the reel in an ejection direction for ejecting the retrieved crop.

By actively rotating the reel in the ejection direction (i.e. the direction opposite to the direction of rotation when the crop is being picked up), the crop which, in the past, would be left between the auger and the reel, is now ejected and ends up on the field. The driver can now drive on and continue to pick up the crop behind the crop that has just been ejected. Since the driver no longer needs to get out, a significant amount of time can be saved. The foreign objects can be picked up all at once after all the crop has been harvested. Alternatively, it may be decided to leave the foreign objects on the field, because they can easily be detected and ejected during a subsequent harvest.

Actively reversing the different parts of the agricultural implement and/or the crop pick-up mechanism can be actuated directly by the driver, or else run through a (semi-) automatic program that will be triggered when a foreign object is detected or when the driver activates an ejection program. The ejection means preferably make use of the existing drive means for the reel. When the reel, for example, is driven hydraulically to rotate in the pick-up direction, rotating in the ejection direction can also be done hydraulically by using the same hydraulic circuit. For this, the hydraulic circuit should, of course, be designed so that it is capable of driving the reel in two different directions.

In a further embodiment of the crop pick-up according to the invention, the ejection means are configured to rotate the reel primarily one revolution in the ejection direction for ejecting the retrieved crop. This has the advantage that the fingers of the reel are protected from damage that can occur when the reversal of the reel is adversely affected by, for example, a swath that is located just below the crop pick-up during reversing. When the reel meets with too much resistance when reversing, the fingers of the reel could bend or break. By rotating the reel just one revolution, all the crop can be ejected without the need for any unnecessary revolutions where the fingers can be damaged.

As an alternative protection measure, the ejection means can also be configured to rotate the reel for a predetermined time interval in the ejection direction for ejecting the retrieved crop.

Moreover, the crop pick-up can comprise means for interrupting or stopping to actively rotate the reel in the ejection direction, when a certain resistance is felt when the reel is actively rotated in the ejection direction. It is immaterial whether the reversal of the reel is initiated by the driver or by an automatic program. As soon as a certain resistance is felt, reversal is interrupted or stopped, to protect the fingers of the reel from damage. The driver can then, for example, lift the crop pick-up a little higher and resume the ejection operation.

In a preferred embodiment, the reel, when ejecting, is hydraulically driven and the ejection means comprise a hydraulic pressure valve for interrupting or stopping active rotation of the reel in the ejection direction when a certain resistance is felt while the reel is actively rotated in the ejection direction.

According to a second aspect of the invention, an agricultural implement is provided, comprising a crop pick-up as described above, a crop inlet with infeed rolls to collect picked-up crop and a control unit coupled to the infeed rolls and to the drive means and the ejection means of the crop pick-up, so that, when a foreign object is detected in a picked-up crop, the infeed rolls, the auger and the reel of the crop pick-up are actively rotated in such a manner that that the crop already collected by the crop pick-up is retrieved and ejected.

Such an agricultural implement can, for example, be a forage harvester, a baler or a loading wagon. The control unit can respond fully automatically to the detection of a foreign object or be partially or entirely operated by the user of the agricultural implement.

According to a third aspect of the invention, a method is provided for ejecting a foreign object from an agricultural implement for picking up crop from a field, the method comprising the following steps:

picking up the crop from the field by a reel with pick-up fingers;

transporting the picked-up crop by an auger to a crop inlet of the agricultural implement;

collecting the transported crop by infeed rolls;

detecting a foreign object in the collected crop;

rotating the infeed rolls and the auger so that crop already collected is retrieved along with the foreign object in the direction of the reel; and actively rotating the reel in an ejection direction for ejecting the retrieved crop with the foreign object.

The method can also include other operations that have already been described above for the crop pick-up and the agricultural implement according to the invention. The different steps that follow the detection of a foreign object can be initiated by the user, either partly or wholly, or can automatically follow a preceding step in the process.

The reversing of the infeed rolls and auger can start and stop simultaneously, but not necessarily. The auger can also start reversing earlier or later than the infeed rolls. For optimal results, it is important that the auger rotates for a brief moment after the infeed rolls have pushed all the crop that is still present through the crop inlet back to the auger. Actively reversing the reel starts ideally a few seconds after the auger has started reversing or when there is no more crop left between the infeed rolls to be pushed to the auger. As long as the reel is not actively reversed, it is preferably set in a neutral position so that it can rotate along passively with the crop pushed by the auger. As described above, in order to protect the fingers of the reel, it may be useful to actively run the reel only for one or more limited intervals of time.

DETAILED DESCRIPTION OF THE EMBODIMENTS OF THE INVENTION

Figure 1:
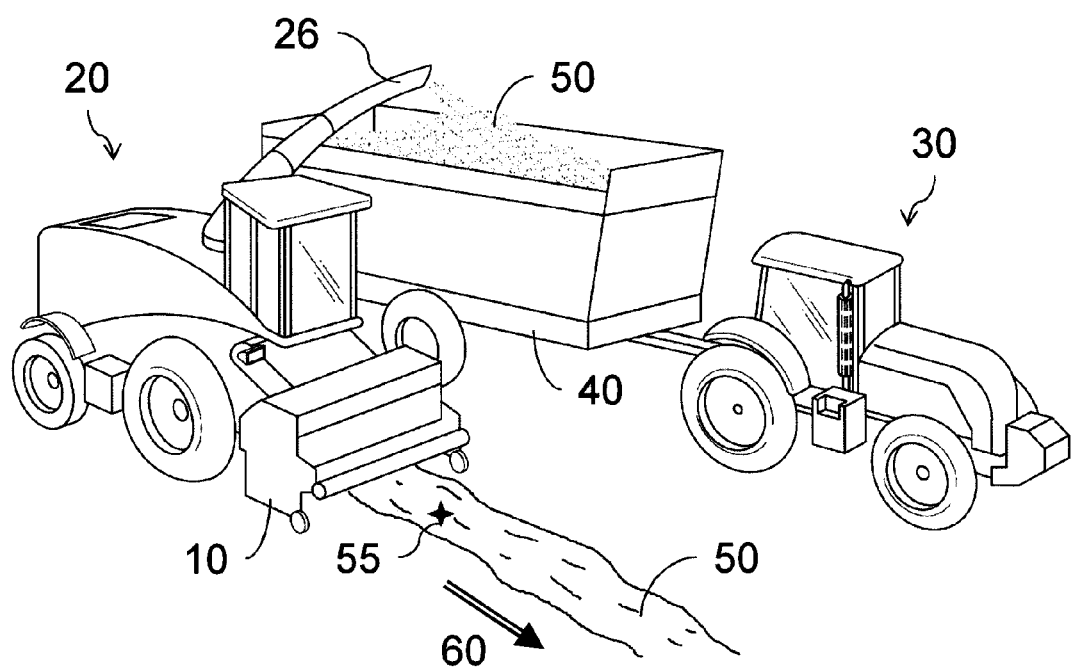
FIG. 1 shows an agricultural implement with a crop pick-up.

FIG. 1 shows an agricultural implement 20 with a crop pick-up 10. In this example, although the agricultural implement is a forage harvester 20, the invention can also be applied to, for example, a baler, a loading wagon or any other agricultural implement that picks up cut down crop from a field. The crop to be picked up will, in the following examples, be grass 50 which has previously been deposited in a swatch 50 on the field by a swath mower, but the invention can also be applied to picking up other crop species. The crop pick-up 10, described in more detail in the description of FIG. 2 below, picks up the swath 50 and transports it to the crop inlet of the forage harvester 20. In the forage harvester, the grass 50 is cut, only to be discharged through a blower (see FIG. 2), via a spout 26 into an accompanying wagon 40. In this example, the wagon 40 is pulled by a tractor 30, but instead of a tractor 30 with wagon 40, a self-propelled dump truck may also be used.

When foreign objects 55 are present in the grass 50 to be picked up, these can be picked up with the grass 50 by the crop pick-up 10 and conveyed to the forage harvester 20. This may lead to serious damage in and around the forage harvester 20, and even to unsafe situations since these objects 55, or parts thereof, are catapulted by the cutter drum 23 (see FIG. 2) of the forage harvester 20 in a random direction. When these foreign objects 55, or parts thereof, end up with the crop 50 in the wagon 40, they can constitute a safety risk for the cattle that will be fed the crop 50. In order to prevent such foreign objects 55, for example metal objects, stones or bits of wood, from ending up in the cutter drum 23 of the forage harvester 20, the present invention offers a solution in the form of an improved system to eject such objects 55 immediately after detection without interrupting the activities in a significant way. The operation of the invention will be illustrated with the exemplary embodiment shown in FIG. 2.

Figure 2:
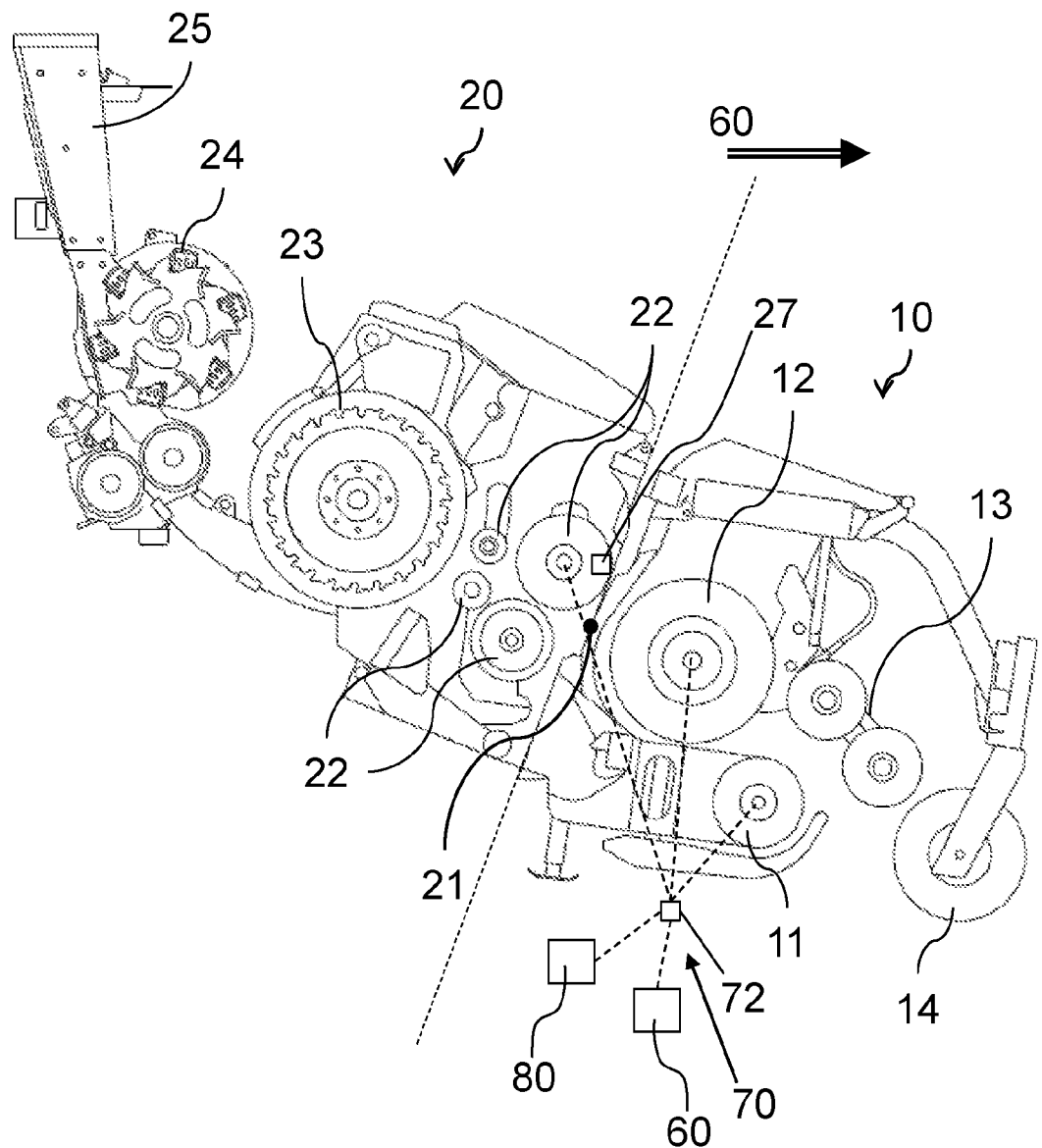
FIG. 2 shows a cross-sectional view of a crop pick-up and parts of a forage harvester.

FIG. 2 shows a cross section of a crop pick-up 10 and parts of a forage harvester 20. The crop pick-up 10 comprises a rake constituted by a reel 11 with pick-up fingers for picking up the crop from a field. When the forage harvester 20 drives over a swath 50 (see FIG. 1) forwards 60, the reel 11 is actively rotated in a pick-up direction (in this cross section counter-clockwise), so that the fingers of the reel 11 take the crop 50 in the swath from the field. The crop 50 picked up by the reel 11 is conveyed to the auger 12 thanks to the rotational movement of the reel 11. The auger 12 rotates in a direction of collection (direction of rotation, depending on the form of the auger 12) to transport the picked-up crop 50 from the outer sides towards the center of the crop pick-up 10. The crop pick-up 10 is attached to the forage harvester 20 in the center, whose crop inlet 21 is equipped to collect the crop 50. In an alternative embodiment, the crop inlet 21 can also be situated on the side of the forage harvester 20. The auger 12 will then have to be designed in such a way as to ensure that all the picked-up crop 50 is conveyed to the corresponding side of the crop pick-up 10. Usually, the reel 11 is driven hydraulically and the auger 12 mechanically, but other, for example electrical, drive means 60 can also be used.

The crop pick-up 10 is further equipped with ejection means 70 that are configured to actively rotate the reel 11 in an ejection direction for ejecting the retrieved crop 50. The ejection means 70 preferably make use of the existing drive means 60 for the reel 11. In an exemplary embodiment, the reel 11, when ejecting, is hydraulically driven by the drive means 60, and the ejection means 70 comprise a hydraulic pressure valve 72 for interrupting or stopping active rotation of the reel 11 in the ejection direction when a certain resistance is felt while the reel 11 is actively rotated in the ejection direction.

The crop pick-up 10 further includes one or more, preferably two, support wheels 14 to guide the crop pick-up 10 in a stable manner and at the correct height across the field. A windguard 13 may prevent crop 50 picked up by the reel 11 from being blown away before it can be guided via the auger 12 to the crop inlet 21 of the forage harvester 20. The windguard 13 can feature one or more additional rolls or reels to support the function of the reel 11. These additional rolls may rotate passively with the picked-up crop 50 or else may be actively driven.

Four infeed rolls 22 of the forage harvester 20 pull the crop 50 supplied by the auger 12 through the crop inlet 21 into the forage harvester 20. Alternative embodiments that encompass more, or fewer, infeed rolls 22 are also possible. The infeed rolls 22 pass on the crop 50 to a cutter drum 23 by which the picked-up crop 50 is chopped. A blower 24 blows the chopped crop 50 via an exit 25 to a rotatable spout 26 so that the chopped crop 50 is discharged into, for example, a wagon 40 pulled alongside the forage harvester 20.

Close to crop inlet 21, for example inside the bottom and/or top infeed roll 22, at least one detector 27 is provided for the detection of foreign objects 55 in the crop flow. The closer the detector is located to the crop inlet 21, the earlier the infeed rolls 22 can be stopped and the greater the chance that the crop flow can be interrupted before the foreign object 55 disappears into the cutter drum 23. Metal detectors and stone detectors are commonly used in forage harvesters 20, but detectors for other types of crop-foreign objects 55 can also be used in combination with the present invention.

It should be noted that the invention can, in principle, also be useful when there is no detector for foreign objects 55 provided. In that case, it will be up to the user to detect the foreign object 55, for example because the user spots the object 55 on the ground, among the crop 50, before the crop 50 is picked up by the crop pick-up 10. For further details about the invention, it will be assumed, however, that the detection of the foreign object 55 can be performed by a detector that is suitable for this purpose.

A control unit 80 is coupled to the infeed rolls 22 and to the drive means 60 and the ejection means 70 of the crop pick-up 10, so that, when a foreign object is detected in a picked-up crop 10, the infeed rolls 22, the auger 12 and the reel 11 of the crop pick-up 10 are actively rotated in such a manner that that the crop 50 already collected by the crop pick-up 10 is retrieved and ejected.

As soon as a foreign object 55 is detected, the infeed rolls 22 are stopped automatically. In the metal detection system that is currently available on the market, the infeed rolls 22 are, for example, brought to a standstill within 300 milliseconds. Consequently, the crop 50 located between the infeed rolls 22, including the foreign object 55, can no longer end up in the cutter drum 23, so that damage to this cutter drum 23 can be avoided and it becomes possible to remove the foreign object 55 from the forage harvester 20 before proceeding with the harvest operations.

After the infeed rolls 22 have stopped, or simultaneously, the auger 12, the reel 11 and the forage harvester 20 are also stopped, so that no more crop 50 is picked up. Also the auger 12, reel 11 and forage harvester 20 are stopped automatically and/or by intervention of the user. The user can, for example, engage the brake of the forage harvester 20 to bring it to a standstill and thereafter press on a stop button to stop the auger 12 and the reel 11 rotating. In fact, the forage harvester 20 can also be driven backwards a short distance so as not to be hindered by the swath 50 still on the field when it later throws back already collected crop 50. Part of this operation can also automatically and immediately follow the detection of the foreign object 55. The foreign object 55 is still situated inside the forage harvester 20 and cannot be removed manually without partly dismantling the forage harvester 20.

In order to remove the foreign object 55 from the forage harvester 20, the infeed rolls 22 are reversed, i.e. in the direction opposite the direction of rotation when the picked-up crop 50 is collected and conveyed to the cutter drum 23. As a result, the crop 50 is retrieved through the crop inlet 21 to the crop pick-up 10. By rotating the auger 12 in the direction opposite to the direction of rotation when the crop 50 is being picked up, the crop 50 pushed out through infeed rolls 22 is spread across the width of the auger 12 and pushed further in the direction of the reel 11. In the known metal detection system, the reel 11 is put in a neutral position, so that it can rotate along with the crop 50 pushed back through the auger 12. A portion of the crop 50 pushed back will fall on the field, while the rest of the pushed-back crop 50 will remain caught between the auger 12 and the reel 11 on the crop pick-up 10. The driver of the forage harvester 20 will then be required to get out of his cab to remove the detected and pushed-back foreign object 55 from the crop 50, upon which he can proceed with his activities. The detection system will preferably show, for example on a monitor in the cab of the forage harvester 20, the approximate location of the foreign object 55 within the crop flow. This tells the driver where approximately he should look for the foreign object 55.

According to the invention, in the crop pick-up 10, not just the auger 12, but also the reel 11 is actively reversed. This means that crop 50 will not be left on the crop pick-up 10, but all the pushed back-crop 50, along with the foreign object 55, will fall on the field. It is therefore no longer necessary for the driver to get out of his cab, because he can proceed without running the risk of the foreign object 55 still being in the crop pick-up 10 and re-entering the forage harvester 20 via the crop inlet 21.

Just like stopping the infeed rolls 22, the reversing of the auger 12 and the reel 11 can be started either (semi-)automatically or manually. Preferably, a reverse program is initiated by the user, for example by pressing a dedicated button or by selecting this activity by means of a graphic user interface. As soon as the reverse program is started, the different components can be reversed in a predetermined sequence. The infeed rolls 22 and auger 12 can, for example, be started simultaneously, which is followed after a few seconds by the reversing of the reel 11. Practice has shown that good results can be achieved by starting the active reversal of the reel 11 five seconds after the auger 12, and that only one or a few revolutions are needed to throw all the crop 50 to be ejected back on the field. It should, however, be noted that optimal timing will, obviously, depend on the particular circumstances. The rotational speeds of the different components can be brought into line with each other to the extent that the crop 50 is ejected in the most efficient way possible. Moreover, the sequence in which, and time at which, the drive of the different components is switched off can be determined by the reverse program, In a very advanced embodiment, a video camera and image-processing software can, for example, be used to detect when there is no more crop 50 on the crop pick-up, at which point the reverse program can be switched off.

In the case of a more manual control of the ejection system, the infeed rolls 22, the auger 12 and the reel 11 rotate simultaneously as long as the user presses the dedicated button. A possible semi-automatic control system could, for example, allow the reel 11 to make a full revolution once per fixed time interval until such time as the user sees that all the crop has been thrown back onto the field and he releases the reverse button.

During time intervals in which the auger 12 is, and the reel 11 is not, actively reversed, the reel 11 is preferably in a neutral position in which it, if necessary, can rotate passively along with the pushed back crop 50. This can be necessary to protect the relatively long and flexible fingers of the reel 11 against bending and/or breaking. To protect these fingers, it is also preferable to minimize resistance to it during actively reversing the reel 11. Resistance to actively reversing can, for example, be occasioned because the reel 11 is only just above the swath 50 and the fingers are still grabbing the crop 50 on the field. To minimize this resistance, different measures can be taken that are not mutually exclusive:

Before starting the reversal of the infeed rolls 22, the auger 12 and the reel 11, the crop pick-up 10 can be lifted, so that the fingers of the reel 11 can no longer touch the swath 50.

If present, lifting the windguard 13 to prevent the pushed back crop 50 from being caught between the reel 11 and windguard 13.

Limiting the reversal of the reel 11 to a fixed and limited number of revolutions or seconds.

Adding a sensor that measures the resistance to the reversal of the reel 11. When this sensor detects a resistance exceeding a predetermined threshold value, the reversing can be stopped or interrupted. The reel 11 could then possibly rotate briefly in the pick-up direction, only to continue rotating in the ejection direction thereafter.

In the event that the reel 11 is hydraulically driven, a hydraulic pressure valve 42 can be included in the hydraulic circuit 40, so that the drive is automatically interrupted when the resistance is too great.

As required, detailed embodiments of the present invention are disclosed herein; however, it is to be understood that the disclosed embodiments are merely exemplary of the invention. Therefore, specific structural and functional details disclosed herein are not to be interpreted as limiting, but merely as a basis for the claims and as a representative basis for teaching one skilled in the art to variously employ the present invention in virtually any appropriately detailed structure. Furthermore, the terms and phrases used herein are not intended to be limiting, but rather to provide an understandable description of the invention.

The terms "a" or "an", as used herein, are defined as one or more than one. The term plurality, as used herein, is defined as two or more than two. The terms including and/or having, as used herein, are defined as comprising (i.e., open language, not excluding other elements or steps). The reference numbers in the claims may not be interpreted as limiting the scope of the claims of the invention.

The mere fact that certain measures are mentioned repeatedly in different claims does not mean that a combination of these measures cannot be used beneficially.

The term "coupled", as used herein, is defined as connected, although not necessarily directly, and not necessarily mechanically.

The invention claimed is:

1. An agricultural implement comprising:
a crop inlet with infeed rolls;
a crop pick-up comprising:
   a reel with pick-up fingers operable to pick up crop from a field;
   an auger operable to transport the picked-up crop to the crop inlet, wherein the infeed rolls collect the picked-up crop;
   a driver operable to rotate the reel in a pick-up direction and the auger in a collection direction for picking up and transporting the crop, and to rotate the auger in a retrieval direction for retrieving already collected crop when a foreign object is detected in the already collected crop; and
   an ejector operable to actively rotate the reel in an ejection direction for ejecting the retrieved already collected crop from the crop pick-up;
a control unit coupled to the infeed rolls and to the driver and the ejector of the crop pick-up, the control unit configured such that, when the foreign object is detected, the infeed rolls and the auger and the reel of the crop pick-up are actively rotated in such a manner that the already collected crop is retrieved and ejected,
wherein the control unit is further configured so that, when the foreign object is detected, first the infeed rolls and the auger of the crop pick-up are rotated in the retrieval direction, and the reel of the crop pick-up is actively rotated in the ejection direction after a predetermined time interval only.

2. The agricultural implement according to claim 1, further comprising a detector for detecting the foreign object in the already collected crop, the control unit further being coupled to the detector so that, when the detector detects the foreign object, the infeed rolls and the auger and the reel of the crop pick-up are actively rotated to retrieve and eject the already collected crop.

3. The agricultural implement according to claim 1, wherein the control unit is further configured so that, when the foreign object is detected, the reel of the crop pick-up is rotated substantially one revolution in the ejection direction for ejecting the already collected crop.

4. The agricultural implement according to claim 1, wherein the control unit is further configured so that, when the foreign object is detected, the reel of the crop pick-up is rotated for a certain time interval in the ejection direction for ejecting the already collected crop.

5. The agricultural implement according to claim 1, further comprising an interrupter for interrupting or stopping the active rotation of the reel in the ejection direction when, during the active rotation of the reel in the ejection direction, a certain resistance is experienced.

6. A method for ejecting a foreign object from an agricultural implement for picking up crop from a field, the method comprising steps of:
picking up the crop from the field by a reel with pick-up fingers;
transporting the picked-up crop by an auger to a crop inlet of the agricultural implement;
collecting the transported crop by infeed rolls;
detecting the foreign object in the collected crop;
rotating the infeed rolls and the auger in a retrieval direction so that the collected crop is retrieved along with the foreign object in a direction of the reel; and
actively rotating the reel in an ejection direction for ejecting the retrieved collected crop with the foreign object, wherein the reel is actively rotated in the ejection direction after a predetermined time interval after the infeed rolls and the auger started rotating in the retrieval direction.

7. The method according to claim 6, wherein during the ejection of the retrieved collected crop with the foreign object, the reel substantially rotates one revolution.

8. The method according to claim 6, wherein during the ejection of the retrieved crop with the foreign object, the reel rotates during a predetermined time interval.

9. The method according to claim 6, further comprising a step of interrupting or stopping the active rotation of the reel in the ejection direction when, during the active rotation of the reel in the ejection direction, a certain resistance is experienced.

\* \* \* \* \*